(12) United States Patent
Rudolf et al.

(10) Patent No.: US 9,007,991 B2
(45) Date of Patent: *Apr. 14, 2015

(54) METHOD AND SYSTEM FOR DELIVERY OF ASSISTANCE DATA

(75) Inventors: Marian Rudolf, Montreal (CA); Teresa Joanne Hunkeler, Montreal (CA); Shamim Akbar Rahman, Cote St. Luc (CA); Stephen G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/039,442

(22) Filed: Mar. 3, 2011

(65) Prior Publication Data

US 2011/0149867 A1  Jun. 23, 2011

Related U.S. Application Data

(63) Continuation of application No. 10/893,625, filed on Jul. 16, 2004, now Pat. No. 7,903,620.

(60) Provisional application No. 60/487,980, filed on Jul. 17, 2003.

(51) Int. Cl.
*H04W 4/00* (2009.01)
*H04W 48/10* (2009.01)
*H04W 36/08* (2009.01)

(52) U.S. Cl.
CPC .............. *H04W 48/10* (2013.01); *H04W 36/08* (2013.01)

(58) Field of Classification Search
USPC ........ 455/434, 432.1–432.2, 435.2, 436–453, 455/507, 509, 511–515, 517, 524–525; 370/328–329, 331–332, 338, 350
See application file for complete search history.

(56) References Cited

U.S. PATENT DOCUMENTS

| 5,353,332 | A | 10/1994 | Raith et al. |
| 5,465,358 | A | 11/1995 | Blades et al. |
| 5,726,688 | A | 3/1998 | Siefert et al. |
| 5,768,267 | A | 6/1998 | Raith et al. |

(Continued)

FOREIGN PATENT DOCUMENTS

| EP | 0 808 049 | 11/1997 |
| EP | 0 84 9967 | 6/1998 |

(Continued)

OTHER PUBLICATIONS

"Draft Recommended Practice for Multi-Vendor Access Point Interoperability via an Inter-Access Point Protocol Across Distribution Systems Supporting IEEE 802.11 Operation." IEEE Std 802.11f/D3.1, Apr. 2002.

(Continued)

*Primary Examiner* — Shahriar Behnamian
(74) *Attorney, Agent, or Firm* — Volpe and Koenig, P.C.

(57) ABSTRACT

A method and apparatus are used for providing assistance data to wireless transmit/receive units (WTRU)s. The assistance data may include information regarding neighboring access points (AP)s. The assistance data may be transmitted to WTRUs using multicast, broadcast, and/or point-to-point signaling. The assistance data may be used to facilitate ring and handover of WTRUs from one AP to another.

10 Claims, 4 Drawing Sheets

(56) References Cited

U.S. PATENT DOCUMENTS

| | | | |
|---|---|---|---|
| 5,982,758 A | 11/1999 | Hamdy | |
| 6,016,311 A | 1/2000 | Gilbert et al. | |
| 6,067,297 A | 5/2000 | Beach | |
| 6,201,969 B1* | 3/2001 | Meier | 455/442 |
| 6,246,673 B1 | 6/2001 | Tiedemann et al. | |
| 6,259,898 B1 | 7/2001 | Lewis | |
| 6,332,077 B1 | 12/2001 | Wu et al. | |
| 6,349,770 B1 | 2/2002 | Brooks et al. | |
| 6,522,881 B1 | 2/2003 | Feder et al. | |
| 6,611,692 B2 | 8/2003 | Raffle et al. | |
| 6,671,284 B1* | 12/2003 | Yonge et al. | 370/462 |
| 6,747,968 B1 | 6/2004 | Seppälä et al. | |
| 6,771,962 B2 | 8/2004 | Saifullah et al. | |
| 6,801,777 B2 | 10/2004 | Rusch | |
| 6,980,810 B1 | 12/2005 | Gerakoulis et al. | |
| 6,990,428 B1 | 1/2006 | Kaiser | |
| 7,013,133 B2 | 3/2006 | Hayduk | |
| 7,088,702 B2 | 8/2006 | Shvodian | |
| 7,185,360 B1 | 2/2007 | Anton, Jr. et al. | |
| 7,239,844 B2 | 7/2007 | Fischer | |
| 7,346,369 B2 | 3/2008 | Fitton et al. | |
| 7,373,431 B2 | 5/2008 | Kondo | |
| 2001/0005177 A1 | 6/2001 | Norimatsu | |
| 2001/0006552 A1 | 7/2001 | Salokannel | |
| 2002/0085516 A1 | 7/2002 | Bridgelall | |
| 2002/0085719 A1 | 7/2002 | Crosbie | |
| 2002/0142771 A1 | 10/2002 | Saifullah et al. | |
| 2002/0193111 A1* | 12/2002 | Wallstedt et al. | 455/434 |
| 2003/0003913 A1 | 1/2003 | Chen et al. | |
| 2003/0007467 A1 | 1/2003 | Sawada et al. | |
| 2003/0013447 A1 | 1/2003 | Persson et al. | |
| 2003/0041150 A1 | 2/2003 | Passman et al. | |
| 2003/0058818 A1 | 3/2003 | Wilkes et al. | |
| 2003/0086437 A1 | 5/2003 | Benveniste | |
| 2003/0134650 A1 | 7/2003 | Sundar et al. | |
| 2003/0137970 A1 | 7/2003 | Odman | |
| 2003/0140296 A1 | 7/2003 | Odman | |
| 2003/0176200 A1 | 9/2003 | Harrison | |
| 2003/0179742 A1* | 9/2003 | Ogier et al. | 370/351 |
| 2003/0203735 A1 | 10/2003 | Andrus et al. | |
| 2003/0214905 A1 | 11/2003 | Solomon et al. | |
| 2004/0054820 A1 | 3/2004 | Karaoguz et al. | |
| 2004/0077349 A1 | 4/2004 | Barak et al. | |
| 2004/0090929 A1 | 5/2004 | Laux et al. | |
| 2004/0092259 A1 | 5/2004 | Blanc et al. | |
| 2004/0105434 A1 | 6/2004 | Baw | |
| 2004/0114546 A1 | 6/2004 | Seshadri et al. | |
| 2004/0125779 A1 | 7/2004 | Kelton et al. | |
| 2004/0137908 A1 | 7/2004 | Sinivaara et al. | |
| 2004/0151137 A1 | 8/2004 | McFarland et al. | |
| 2004/0166857 A1* | 8/2004 | Shim et al. | 455/436 |
| 2004/0214539 A1 | 10/2004 | Rajamani et al. | |
| 2004/0224690 A1 | 11/2004 | Choi et al. | |
| 2004/0235478 A1 | 11/2004 | Lindquist et al. | |
| 2004/0248587 A1 | 12/2004 | Niemenmaa | |
| 2004/0264413 A1 | 12/2004 | Kaidar et al. | |
| 2005/0009565 A1 | 1/2005 | Kwak | |
| 2005/0163077 A1 | 7/2005 | Suda | |
| 2006/0073827 A1 | 4/2006 | Vaisanen et al. | |
| 2006/0092888 A1* | 5/2006 | Jeong et al. | 370/338 |
| 2006/0098592 A1 | 5/2006 | Proctor Jr. et al. | |
| 2006/0153133 A1* | 7/2006 | Zhong | 370/331 |
| 2008/0298249 A1 | 12/2008 | Baker et al. | |

FOREIGN PATENT DOCUMENTS

| | | |
|---|---|---|
| EP | 0 963 130 | 12/1999 |
| EP | 1 006 746 | 6/2000 |
| EP | 1124356 A2 | 8/2001 |
| EP | 1316839 A1 | 6/2003 |
| GB | 2 331 892 | 6/1999 |
| JP | 2000-032548 | 1/2000 |
| JP | 2002112302 A2 | 4/2002 |
| JP | 2002171558 A2 | 6/2002 |
| WO | 96/39766 | 12/1996 |
| WO | 97/15169 | 4/1997 |
| WO | 99/66394 | 12/1999 |
| WO | 00/60895 | 10/2000 |
| WO | 00/67511 | 11/2000 |
| WO | 03/015438 | 5/2003 |
| WO | 03/047176 | 5/2003 |

OTHER PUBLICATIONS

"Draft Supplement to Standard for Information Technology—Telecommunications and Information Exchange Between Systems—LAN/MAN Specific Requirements—Part 11: Wireless Medium Access Control (MAC) and physical layer (PHY) specifications: Spectrum and Transmit Power Management extensions in the 5GHz band in Europe." P802.11h/D3.11, May 2003.

"Draft Supplement to Standard for Information Technology—Telecommunications and Information Exchange Between Systems—LAN/MAN Specific Requirements—Part 11: Wireless Medium Access Control (MAC) and Physical Layer (PHY) Specifications: Spectrum and Transmit Power Management Extensions in the 5GHz Band in Europe." Draft Supplement to IEEE Std 802/11, 2003 Edition, P802.11h/D3.11, May 2003.

"Draft Supplement to Standard for Telecommunications and Information Exchange Between Systems—LAN/MAN Specific Requirements—Part 11: Wireless Medium Access Control (MAC) and Physical Layer (PHY) specifications: Medium Access Control (MAC) Enhancements for Quality of Service (QoS)." IEEE Std 802.11e/D4.0, Nov. 2002.

"Draft Supplement to Standard for Telecommunications and Information Exchange Between Systems—LAN/MAN Specific Requirements—Part 11: Wireless Medium Access Control (MAC) and Physical Layer (PHY) Specifications: Specification for Radio Resource Measurement." IEEE Std 802.11k/D0.2, May 2003.

"Draft Supplement to Standard for Telecommunications and Information Exchange Between Systems—LAN/MAN Specific Requirements—Part 11: Wireless Medium Access Control (MAC) and Physical Layer (PHY) Specifications: Specification for Radio Resource Measurement." IEEE Std 802.11k/D0.3, Jul. 2003.

"Draft Supplement to Standard for Telecommunications and Information Exchange Between Systems—LAN/MAN Specific Requirements—Part 11: Wireless Medium Access Control (MAC) and Physical Layer (PHY) Specifications: Specification for Radio Resource Measurement." IEEE Std 802.11k/D0.4, Jul. 2003.

"Draft Supplement to Standard for Telecommunications and Information Exchange Between Systems—LAN/MAN Specific Requirements—Part 11: Wireless Medium Access Control (MAC) and Physical Layer (PHY) Specifications: Specification for Radio Resource Measurement." IEEE Std 802.11k/D0.9, Nov. 2003.

"Draft Supplement to Standard for Telecommunications and Information Exchange Between Systems—LAN/MAN Specific Requirements—Part 11: Wireless Medium Access Control (MAC) and Physical Layer (PHY) Specifications: Specification for Radio Resource Measurement." IEEE Std 802.11k/D0.15, Jun. 2004.

"Draft Supplement to Standard for Telecommunications and Information Exchange Between Systems—LAN/MAN Specific Requirements—Part 11: Wireless Medium Access Control (MAC) and Physical Layer (PHY) Specifications: Specification for Radio Resource Measurement." IEEE Std 802.11k/D0.1, Mar. 2003.

"Information Technology—Telecommunications and Information Exchange Between Systems—Local and Metropolitan Area Networks—Specific Requirements—Part 11: Wireless LAN Medium Access Control (MAC) and Physical Layer (PHY) Specifications." ANSI/IEEE Std 802.11, 1999 Edition (R2003), Reaffirmed Jun. 2003.

Crow et al., "IEEE 802.11 Wireless Local Area Networks," IEEE Communications Magazine, vol. 35, No. 9 (Sep. 1997).

Defense Advance Research Projects Agency, "Internet Protocol DARPA Internet Program Protocol Specification," RFC 791, Information Sciences Institute (Sep. 1981).

Draft Recommended Practice for Multi-Vendor Access Point Interoperability via an Inter-Access Point Protocol Across Distribution Systems Supporting IEEE 802.11 Operation, IEEE Std. 802.11f/D3.1, Apr. 2002.

(56) References Cited

OTHER PUBLICATIONS

Draft Supplement to Standard for Telecommunications and Information Exchange Between Systems—LAN/MAN Specific Requirements—Part 11: Wireless Medium Access Control (MAC) and physical layer (PHY) specifications: Specification for Radio Resource Measurement, IEEE Std 802.11k/D0.2, May 2003.

Draft Supplement to Standard for Telecommunications and Information Exchange Between Systems—LAN/MAN Specific Requirements—Part 11: Wireless Medium Access Control (MAC) and physical layer (PHY) specifications: Specification for Radio Resource Measurement, IEEE Std 802.11k/D0.3, Jul. 2003.

Draft Supplement to Standard for Telecommunications and Information Exchange Between Systems—LAN/MAN Specific Requirements—Part 11: Wireless Medium Access Control (MAC) and physical layer (PHY) specifications: Specification for Radio Resource Measurement, IEEE Std 802.11k/D0.4, Jul. 2003.

Draft Supplement to Standard for Telecommunications and Information Exchange Between Systems—LAN/MAN Specific Requirements—Part 11: Wireless Medium Access Control (MAC) and physical layer (PHY) specifications: Specification for Radio Resource Measurement, IEEE Std 802.11k/D0.9, Nov. 2003.

Draft Supplement to Standard for Telecommunications and Information Exchange Between Systems—LAN/MAN Specific Requirements—Part 11: Wireless Medium Access Control (MAC) and physical layer (PHY) specifications: Specification for Radio Resource Measurement, IEEE Std 802.11k/D0.15, Jun. 2004.

Draft Supplement to Standard for Telecommunications and Information Exchange Between Systems—LAN/MAN Specific Requirements—Part 11: Wireless Medium Access Control (MAC) and physical layer (PHY) specifications: Specification for Radio Resource Measurement, IEEE Std 802.11k/D0.1, Mar. 2003.

IEEE 802.11 "Radio Resource Measurement Requirements and Issues", Oct. 2002.

Information Technology—Telecommunications and information exchange between systems—Local and metropolitan area networks—Specific requirements—Part 11: Wireless LAN Medium Access Control (MAC) and Physical Layer (PHY) Specifications, ANSI/IEEE Std 802.11, 1999 Edition (R2003), Jun. 2003.

Kitroser, "IEEE 802.16e Handoff Draft," IEEE 802.16 Broadband Wireless Access Working Group (Mar. 13, 2003).

Paine, Richard H., IEEE P802.11 Wireless LANs "Radio Resource Measurement Issues", Jan. 2003.

Paine, Richard. "Radio Resource Management Requirements and Issues, a Reference Document for 802.11, Unapproved Draft." IEEE 802.11-02/508r10, Oct. 2002.

Paine, Richard. "Radio Resource Measurement Issues." IEEE P802.11Wireless LANs, IEEE 802.11-03/134r0. Jan. 2003.

Third Generation Partnership Project, "Technical Specification Group Radio Access Network; Radio Resource Control (RRC) protocol specification (Release 1999)," 3GPP TS 25.331 V3.15.0 (Jun. 2003).

Third Generation Partnership Project, "Technical Specification Group Radio Access Network; Radio Resource Control (RRC) protocol specification (Release 1999)," 3GPP TS 25.331 V3.19.0 (Jun. 2004).

Benveniste, "Self-Configurable Wireless LAN Systems," IEEE 802.11-02/211r0, IEEE Mentor, pp. 1-14 (Apr. 16, 2002).

Kaiser, "New Radio Measurement Actions within the 802.11h Framework," IEEE 802.11-03/029r0, IEEE Mentor, pp. 1-10 (Jan. 14, 2003).

Lefkowitz et al., "Site Reporting," IEEE 802.11-03/174r01, IEEE P802.11 Wireless LANs (Mar. 10, 2003).

Spiess, "Inter-Access Point Protocol Proposal," IEEE 802.11-00/345r1, IEEE P802.11 Wireless LANs, pp. 1-10 (Oct. 27, 2000).

Zhong, "RRM and Roaming Support," IEEE 802.11-03/078r0, IEEE Mentor, pp. 1-11 (Jan. 14, 2013).

* cited by examiner

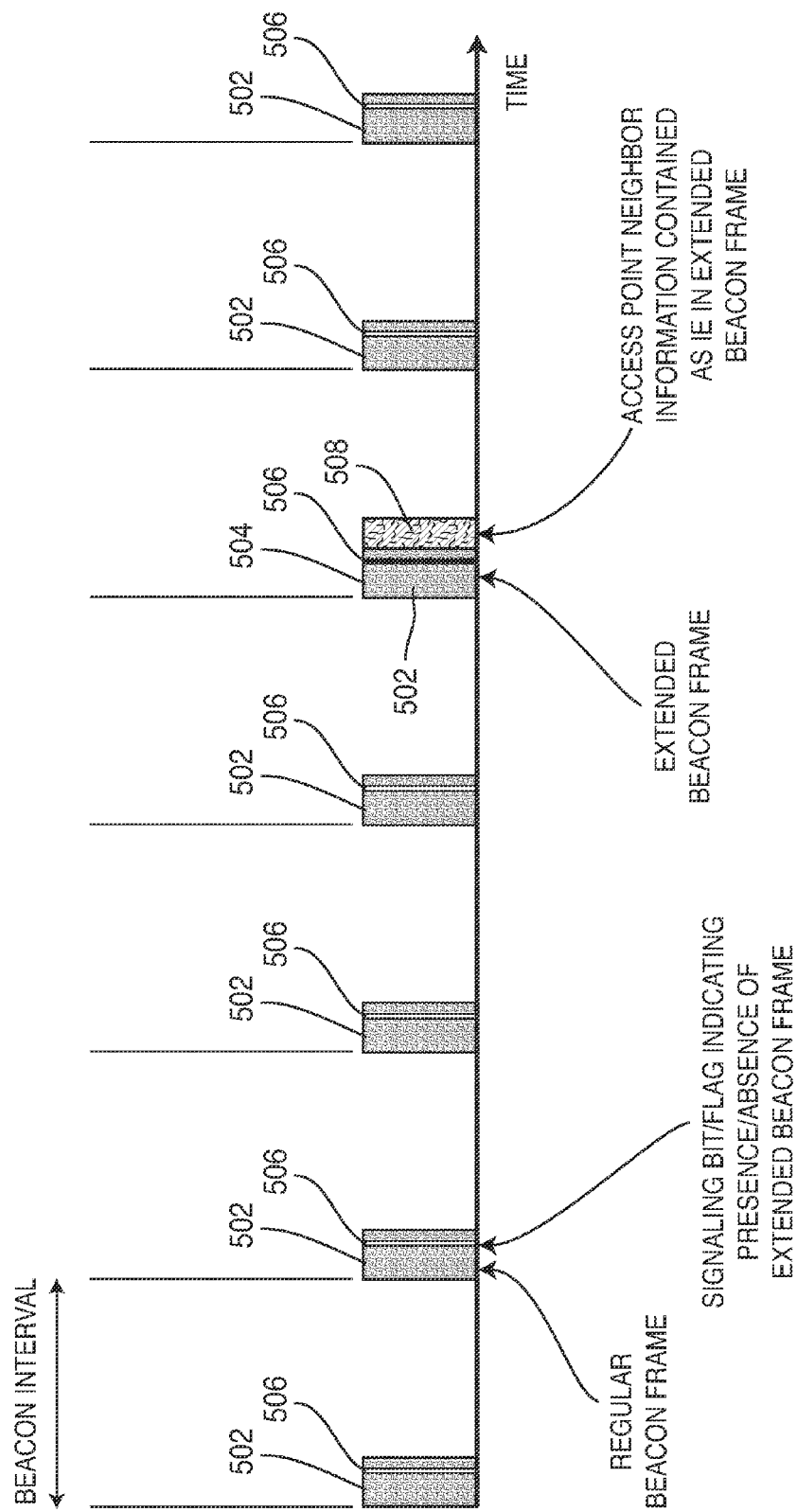

METHOD AND SYSTEM FOR DELIVERY OF ASSISTANCE DATA

CROSS REFERENCE TO RELATED APPLICATIONS

This application is a continuation of U.S. patent application Ser. No. 10/893,625 filed on Jul. 16, 2004, which issued on Mar. 8, 2011 as U.S. Pat. No. 7,903,620, which claims the benefit of U.S. Provisional Application No. 60/487,980 filed on Jul. 17, 2003, the contents of which are hereby incorporated by reference.

FIELD OF INVENTION

The present invention relates to wireless communication systems. More particularly, the present invention relates to delivery of assistance data to wireless transmit/receive units (WTRUs).

BACKGROUND

Referring initially to FIG. 1, there is shown a conventional wireless communication system 100. The system 100 includes at least one wireless transmit/receive unit (WTRU) 102, an access point 104, and at least one system controller 106 for controlling and otherwise managing communications within the system 100. Typically, in wireless local area network (WLAN) type systems, the network may be deployed as shown in FIG. 2.

In FIG. 2, the wireless network 200 comprises a system controller 206, a plurality of access points 214, 216, and a plurality of WTRUs 212, 218. WTRUs 212, 218 are grouped with there respective access points 214, 216. These groupings are commonly referred to as basic service sets (BSSs) 220, 222. A plurality of BSSs 220, 222 are typically connected via a distribution system (DS) 224 wherein a plurality of BSSs are commonly referred to as an extended service set (ESS). The access points 214, 216 are preferably connected to the system controller 206 over a network 219.

Generally, assistance data is data provided, or otherwise accessible at a particular access point, to WTRUs associated with the particular access point. Typically, assistance data may include any type of data relating to any type of information related to access points neighboring the particular access point (i.e. access points whose respective coverage areas are adjacent to the coverage area of the particular access point). Providing assistance data facilitates ring/handover of WTRUs by providing essential information regarding finding/identifying neighboring access points.

By way of example, assistance data may include information regarding neighboring access points such as operational frequency of neighboring WTRUs and access points, access modes [e.g. 802.11 Frequency Hopping Spread Spectrum (FHSS)/Direct Sequence Spread Spectrum (DSSS), 802.11a, 802.11b High Rate Direct Sequence Spread Spectrum (HR-DSSS), etc.], timing, system configuration information regarding neighboring basic service sets (BSSs) [e.g. ready to send (RTS)/clear to send (CTS), Point Coordination Function (PCF), Wired Equivalent Privacy (WEP), etc.].

Currently, assistance data is transmitted using point-to-point (i.e. unicast) signaling. In 802.xx type systems, for example, the assistance data is provided in the form of an Information Element (IE) containing neighbor information. The IE is incorporated into the existing Probe Response frame. The Probe Response frame is typically sent by an access point as a reply to a Probe Request management frame sent by a WTRU when the WTRU is attempting to discover neighboring BSSs. This arrangement is inefficient, however, in that transmitting assistance data using point-to-point signaling results in significant amounts of network traffic thereby significantly increasing the likelihood of significant delays not only with respect to transmission/reception of the assistance data, but also with respect to transmissions/receptions generally.

It would therefore be desirable to provide a method and system for providing WTRUs with assistance data without the limitations discussed above.

SUMMARY

A method and apparatus may be used for providing assistance data to wireless transmit/receive units (WTRU)s. The assistance data may include information regarding neighboring access points (AP)s. The assistance data may be transmitted to WTRUs using multicast, broadcast, and/or point-to-point signaling. The assistance data may be used to facilitate ring and handover of WTRUs from one AP to another.

An AP may obtain information related to a neighbor AP and transmit the obtained neighbor AP information to one or more WTRUs. The AP may transmit the obtained neighbor AP information as a point-to-point message, for example in a management frame. The management frame may include an indicator that indicates a presence of neighbor information in the management frame.

A WTRU may receive a frame from an AP. The frame may be, for example, a management frame, and may be received as a point-to-point message. The frame may include an indicator that indicates a presence of neighbor AP information.

BRIEF DESCRIPTION OF THE DRAWING(S)

FIG. 5 is a diagram of neighbor information being transmitted along with a beacon in the form of an extended beacon at a predetermined multiple of the time period with which the access point transmits its regular beacons.

DETAILED DESCRIPTION OF THE PREFERRED EMBODIMENT(S)

Although the features and elements of the present invention are described in the preferred embodiments in particular combinations, each feature or element can be used alone (without the other features and elements of the preferred embodiments) or in various combinations with or without other features and elements of the present invention.

Herein, a wireless transmit/receive unit (WTRU) includes but is not limited to a user equipment, mobile station, fixed or mobile subscriber unit, pager, or any other type of device capable of operating in a wireless environment. When referred to herein, an access point includes but is not limited to a base station, Node-B, site controller, access point or any other type of interfacing device in a wireless environment.

Herein, the term handover includes changing access points while a WTRU is actively receiving/sending data and the term ring includes changing access points while a WTRU is not actively receiving/sending data. The present invention applies equally to both scenarios and the terms handover and ring may be used interchangeably herein such that both terms refer generically to situations where a WTRU affiliated or otherwise operating with a first access point becomes affiliated with a second access point and the affiliation with the first access point is eventually terminated.

Generally, in the present invention, access points obtain assistance data using OAM, inter-access point signaling, scanning, commanding WTRUs to scan, or a combination thereof and transmit this information as a single message to a plurality of WTRUs. Once obtained, an access point may also share neighbor information with other access points allowing those access points to also transmit the information to WTRUs.

Figure 3:
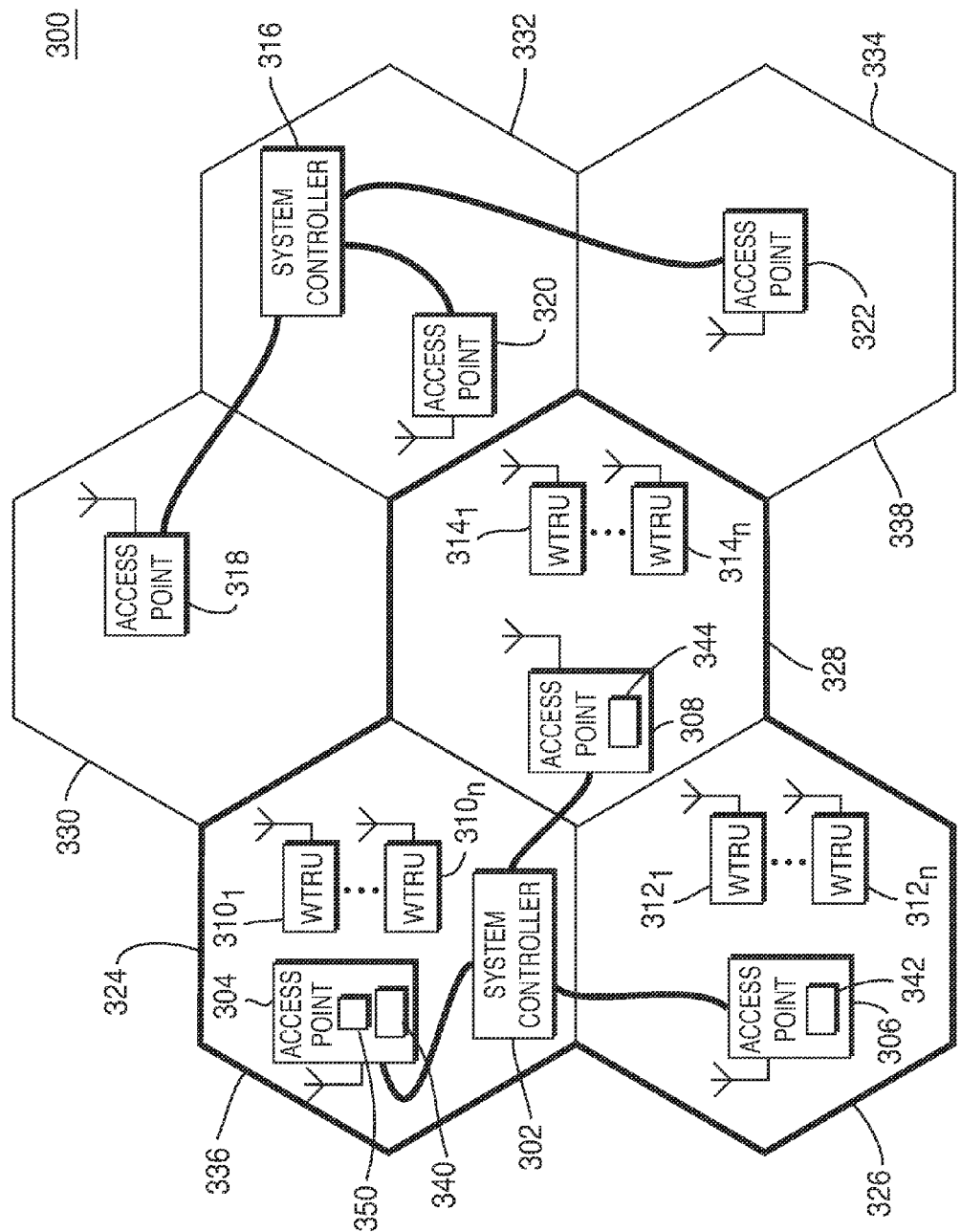
FIG. 3 is a block diagram of a wireless communication system in accordance with the present invention.

Referring now to FIG. 3, there is shown a wireless communication system 300. The system 300 includes at least one extended service set (ESS). For purposes of describing the present invention, however, two ESSs 336, 338 are shown in FIG. 3. The first ESS 336 is configured in accordance with the present invention and includes a system controller 302, plurality of access points 304, 306, 308, and plurality of WTRUs 310, 312, 314. Of course, the first ESS 336 could be configured with a single access point, where appropriate, in which case it may be referred to as a BSS. The overall coverage area of the first ESS 336 is outlined in bold and includes coverage areas, 324, 326, 328. The second ESS 338 also includes a system controller 316, a plurality of access points 318, 320, 322, and a plurality of WTRUs (not shown). The overall coverage area of the second ESS 338 includes coverage areas 330, 332, 334.

In the present invention, the access points 304, 306, 308 of the first ESS 336 each include processors 340, 342, 344 for obtaining assistance data and providing it to their respective WTRUs. The assistance data facilitates handover and ring of WTRUs. It is noted that only the first ESS 336 is shown configured in accordance with the present invention purely for simplicity in describing the invention. Of course, any number of access points regardless of their affiliation with an ESS or BSS may be configured in accordance with the present invention.

The assistance data (i.e. neighbor list or neighbor information) is preferably obtained by operation and maintenance (OAM), proprietary signaling between access points (i.e. inter-access point signaling), active/passive scanning of channels other than the one being used by the scanning access point, and/or measurement reports from WTRUs. The method used for obtaining neighbor information may vary depending on the neighboring access point for which information is sought.

Figure 1:
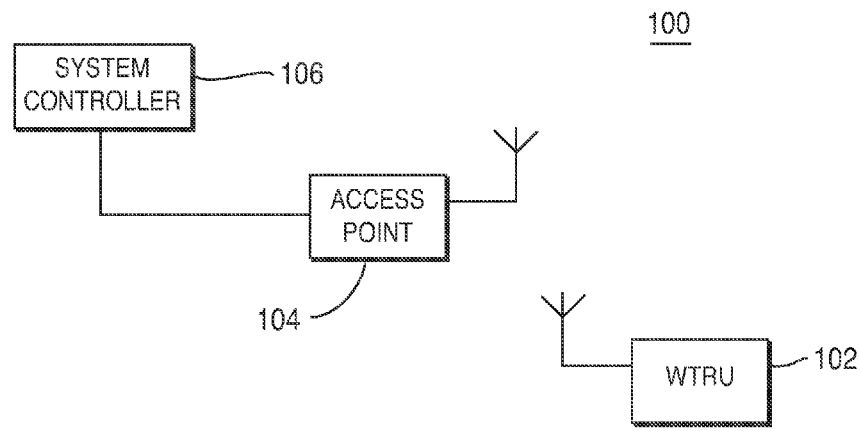
FIG. 1 is a block diagram of a conventional wireless communication system.
Figure 2:
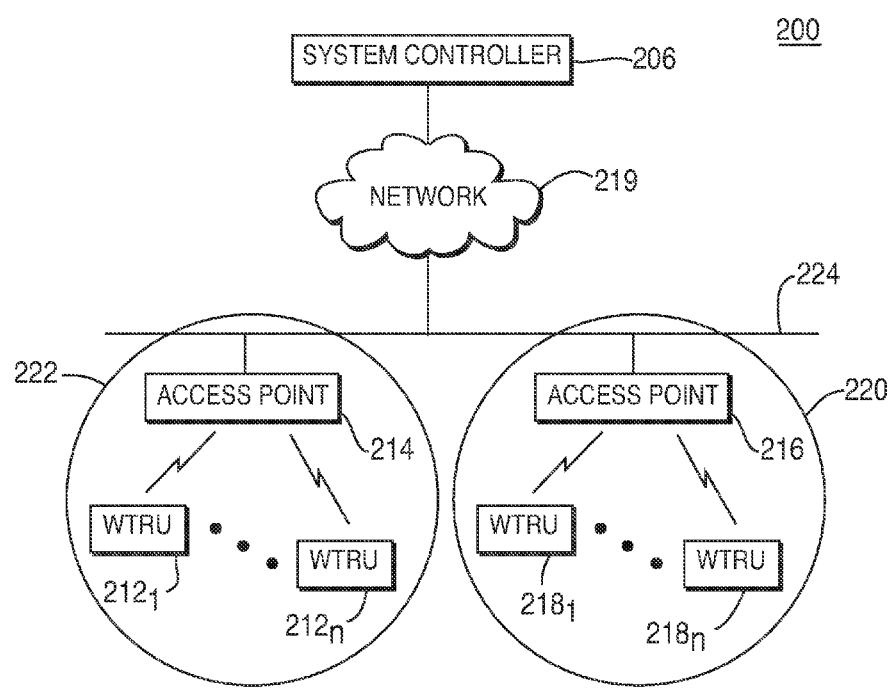
FIG. 2 is a block diagram of a conventional wireless communication system having a plurality of access points and a plurality of WTRUs.

For example, in FIG. 3, when access point 304 is seeking information regarding access points 306 and 308 within the same ESS 336 of the access point 304, it may be preferable to use inter-access point signaling and/or may be preferable because, for example, access points 304, 306, 308 share a common system controller 302 allowing neighbor information regarding access points 306, 308 to be provided to access point 304 via at controller 302. Inter-access point signaling may be preferable because, for example, while direct connections between access points 304, 306, 308 are shown for simplicity, a distribution network as shown in FIG. 2 is typically provided between the access points 304, 306, 308 that make up an ESS 336. The distribution network provides direct wired connections over which inter-access point signaling may efficiently be performed. When using inter-access point signaling, Inter-Access Point Protocol (IAPP) may be used.

As mentioned above, other options are also available for the access point 304 to obtain neighbor information from neighboring access points 306, 308. For example, access point 304 may command WTRUs 310 to scan channels other than the one being used by access point 304 to obtain neighbor information for any detected channels and report back the information. The access point 304 may also scan for other channels itself. Where the access point 304 is scanning, such scanning may be done independently of or together with any scanning being done by the WTRU 310. In this embodiment, a quality metric, such as received power, may be used to choose between measurements obtained by the access point 304 versus measurements obtained by the WTRU 310 for the same channel.

Where the access point 304 is obtaining information regarding a neighboring access point 318 that happens to be outside of access point's 304 ESS 336, it may be preferable to obtain the information via scanning. As discussed above, the access point 304 may perform the scanning (either passively or actively) itself or command the WTRUs 310 to perform the scanning (either passively or actively) and report back. Of course, access point 304 is not limited to using scanning for obtaining neighbor information regarding access point 318. The access point 304 may also obtain information regarding access point 318 using and inter-access point signaling.

The processor 340 of access point 304 is preferably configured to obtain the neighbor information as described above. Of course, more than one processor may be used, as desired. The information obtained by processor 340 may be stored in memory 350, as needed. Further, the processor(s) 340 of the access point 304 is also configured to provide the neighbor information as explained below.

It is noted that the various methods described above may be used in combination where appropriate. For example, when an access point 304 initially comes on-line, and it does not have a neighbor information defined through it can itself scan the surroundings and/or command a few of its WTRUs 310 to scan as well. Once the access point 304 has the results of this scan, it can then use this information to inform other access points 306, 308 within its ESS 336 about the discovery. This will minimize the amount of scanning (which may cause some small disruption in traffic) performed by these access points 306, 308. This arrangement may be particularly helpful where access point 304 is seeking neighbor information from an access point 318 outside ESS 324 because access point's 304 information likely will not include access points 318, 320, 322 outside of ESS 324. It is also noted that in a preferred embodiment, the access point 304 should, after startup and discovery of the neighbor information, periodically scan (or ask one of its WTRUs to scan) to see if the neighbor information situation has changed.

Figure 4:
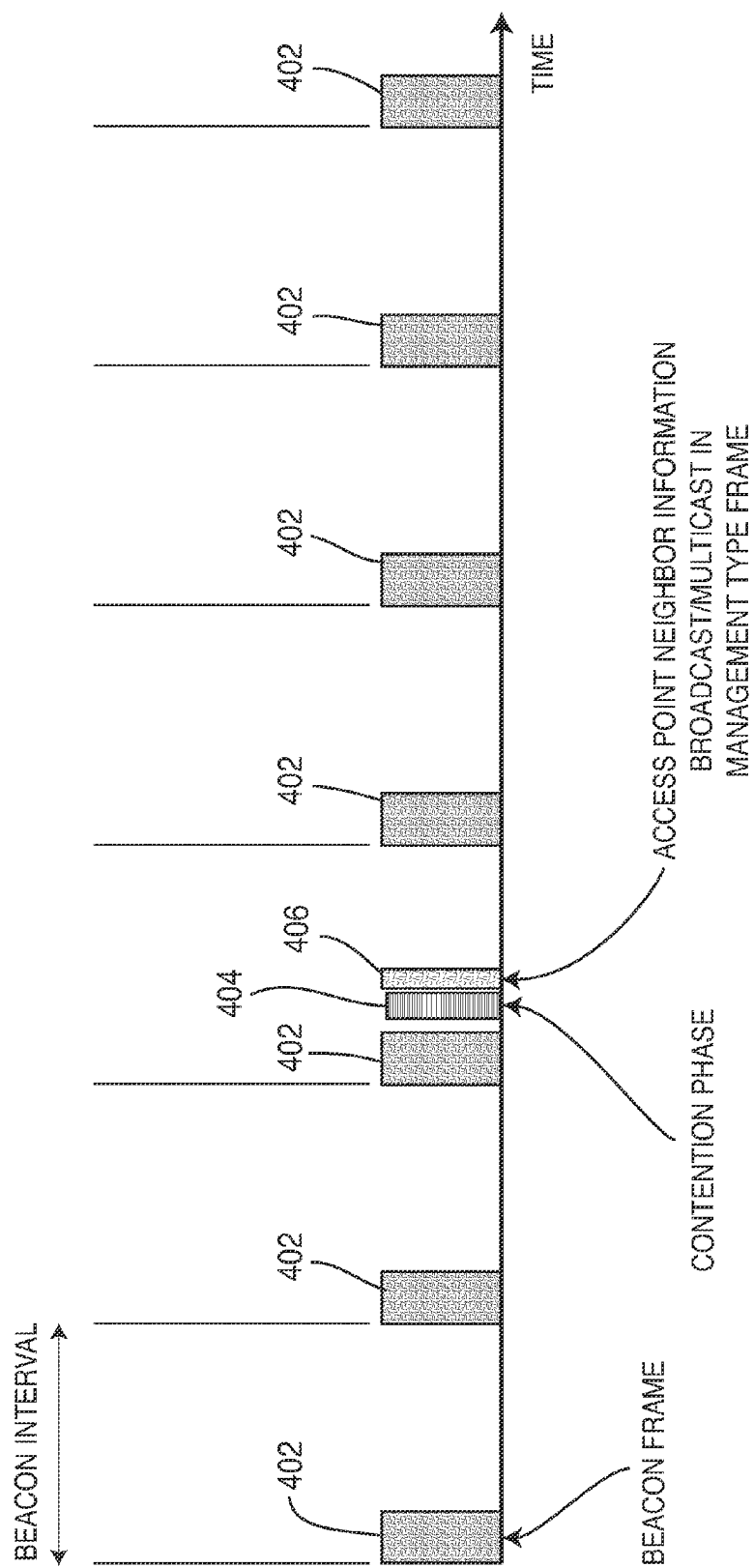
FIG. 4 is a diagram of neighbor information being transmitted by an access point at a predetermined multiple of the time period with which the access point is transmitting its beacons.

The neighbor information obtained by access point 304 is preferably periodically broadcast or multicast to WTRUs 310 operating within the coverage area 336 of access point 304. Referring now to FIG. 4, using WLANs as an example, access points and WTRUs operating within a particular BSS all transmit and receive using a single channel (i.e. frequency). As shown in FIG. 4, the access point periodically transmits a beacon 402 on its respective channel. The time period in which the beacon is transmitted is typically referred to as a beacon frame. The beacon 402 is typically transmitted approximately every 100 ms. Although possible, it is typically not necessary for an access point to transmit the neighbor information it has obtained to its WTRUs at each beacon.

Therefore, in a preferred embodiment, access points are configured to transmit their neighbor information at a predetermined multiple of the time period between which the access points transmit their beacons 402. The multiple may be set as desired and is preferably a function of the degree of mobility of WTRUs affiliated with their respective access point.

By way of example, in FIG. 4, neighbor information 406 is shown being transmitted by an access point at a particular multiple of the beacon interval. The particular access point that is transmitting the neighbor information 406 shares the channel with the WTRUs with which it is affiliated. Therefore, in a beacon interval where neighbor information is being transmitted, once the access point has completed transmission of its beacon 402, it waits a certain amount of time until it can gain access to the channel again. This amount of time is typically referred to as a contention phase 404 because the access point is contending with its respective WTRUs for access to the channel. Once the access point gains access to the channel, it transmits the neighbor information 406 wherein information about neighboring access points is provided, as explained above, to WTRUs affiliated with the access point.

The neighbor information 406 may be transmitted as a multicast message(s) to a predetermined group(s) of WTRUs affiliated with the access point that is transmitting the neighbor information 406. In another embodiment, the neighbor information 406 may be broadcast to all WTRUs affiliated with the transmitting access point. It is noted that the WTRUs, in parallel with the access points' efforts to provide them with neighbor information 406, may also use point-to-point probe requests and/or scanning of channels. The WTRUs may implement such techniques as a backup and/or complement to receiving such information from the access point.

The neighbor information 406 is preferably transmitted using a management type frame (i.e. during a time period wherein system management information is transmitted). The management type frame that is used, in one embodiment, is preferably the same as that which is used in the prior art when WTRUs obtain neighbor information using point-to-point signaling. Further, the associated procedures implemented in a WTRU after it receives neighbor information 406 are the same as that of a point-to-point message, with the exception of the WTRU's acknowledgement.

Referring now to FIG. 5, another embodiment of the present invention is shown. In this embodiment, the typical beacon signal is configured with an extra bit wherein the extra bit indicates the presence/absence of neighbor information. The beacons 502 transmitted in a regular beacon frame are shown with the signaling bit 506 being empty. The beacons 502 are transmitted as normal in a regular beacon frame by an access point according to a predetermined schedule. The periodicity with which the neighbor information is sent is a predetermined multiple of the time period between which the beacons 502 are being transmitted, as discussed above. When it is time for the neighbor information to be transmitted by an access point to its respective WTRUs, the neighbor information 508 is added to the beacon 502 and transmitted along with it in an extended beacon frame 504. In this scenario the signaling bit 506 of the beacon 502 is solid to reflect the fact that the bit is set such that it indicates neighbor information 508 is present within the extended beacon frame 504. In a preferred embodiment, the neighbor information 508 is added to the beacon 502 as an Information Element (IE). As discussed above, the neighbor information 508 includes information that assists WTRUs in efficiently handing over from one access point to a neighboring access point.

It is important to note that the present invention may be implemented in any type of wireless communication system. By way of example, the present invention may be implemented in wireless local area networks (WLAN), wireless personal area networks (WPAN), wireless metropolitan area networks (WMAN) or any other type of wireless communication systems/networks. Further, although the features and elements of the present invention are described in the preferred embodiments in particular combinations, each feature or element can be used alone or in various combinations with or without other features and elements of the present invention

What is claimed is:

1. A wireless transmit/receive unit (WTRU) configured to receive neighbor access point (AP) information, the WTRU comprising:
   a receiver configured to:
      receive, from a first AP, a command to perform a scan of neighboring APs; and
      receive a beacon from at least one neighboring AP, wherein the beacon includes an indicator that indicates, on a condition that the beacon includes neighbor AP information, a first value to indicate a presence of neighbor AP information in the beacon and indicates, on a condition that the beacon does not include neighbor AP information, a second value to indicate an absence of neighbor AP information in the beacon, and wherein the neighbor AP information includes an indication of a channel on which another AP is operating; and
   a transmitter configured to transmit a report in response to the command based on the received beacon from the at least one neighboring AP.

2. The WTRU of claim 1 wherein the
   transmitter is configured to transmit a request for second neighbor AP information to a second WTRU, and
   wherein the receiver is further configured to receive neighbor AP information from the second WTRU in response to the request.

3. The WTRU of claim 1, wherein the
   transmitter is configured to transmit a request for second neighbor information to an access point (AP), and
   wherein the receiver is further configured to receive neighbor AP information in response to the request.

4. The WTRU of claim 1, wherein the scan is an active scan.

5. The WTRU of claim 1, wherein the scan is a passive scan.

6. A method for use in a wireless transmit/receive unit (WTRU), the method comprising:
   receiving, from a first access point (AP), a command to perform a scan of neighboring APs;
   receiving a beacon from at least one neighboring AP, wherein the beacon includes an indicator that indicates, on a condition that the beacon includes neighbor AP information, a first value to indicate a presence of neighbor AP information in the beacon and indicates, on a condition that the beacon does not include neighbor AP information, a second value to indicate an absence of neighbor AP information in the beacon, and wherein the neighbor AP information includes an indication of a channel on which another AP is operating; and
   transmitting a report in response the command based on the received beacon from the at least one neighboring AP.

7. The method of claim 6 further comprising:
   transmitting a request for second neighbor AP information to a second WTRU; and receiving neighbor AP information from the second WTRU in response to the request.

8. The method of claim 7, wherein the second WTRU is an access point (AP).

9. The method of claim 6, wherein the scan is an active scan.

10. The method of claim 6, wherein the scan is a passive scan.

* * * * *